March 15, 1949.                    O. HAMMER                     2,464,390
                              OILWELL CASING SCRAPER
Filed June 2, 1945                                            2 Sheets-Sheet 1
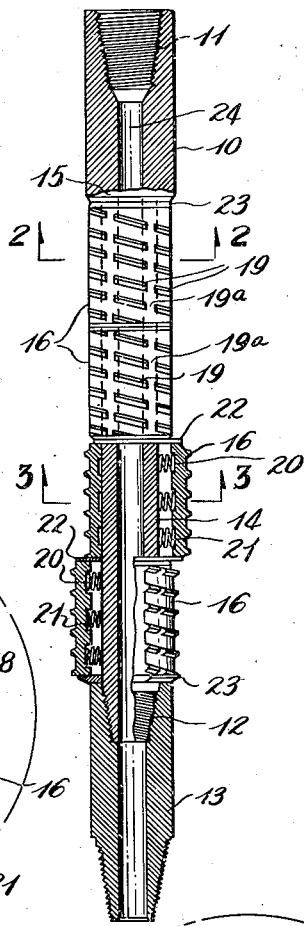
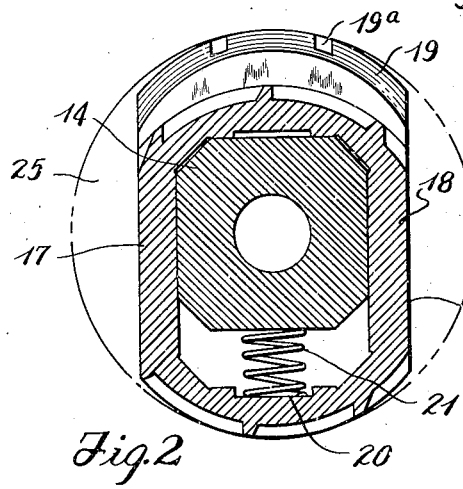
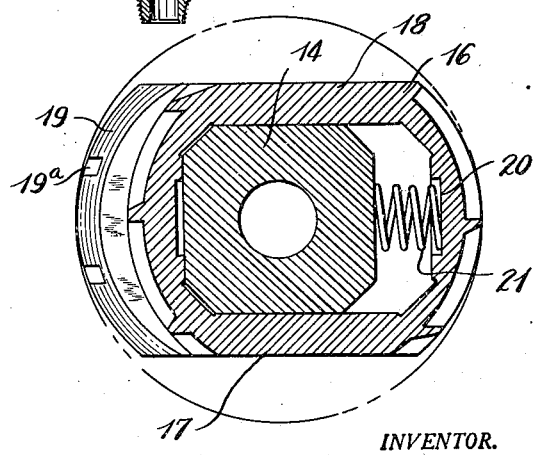
INVENTOR.
OTTO HAMMER
BY Hazard & Miller
Attorneys

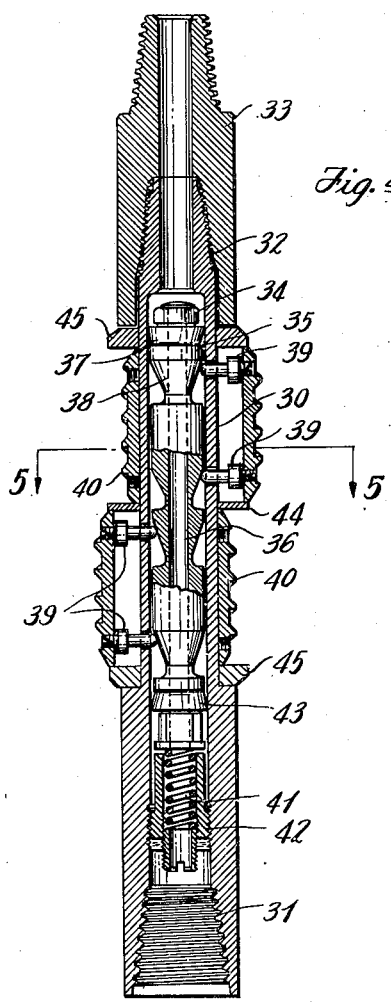
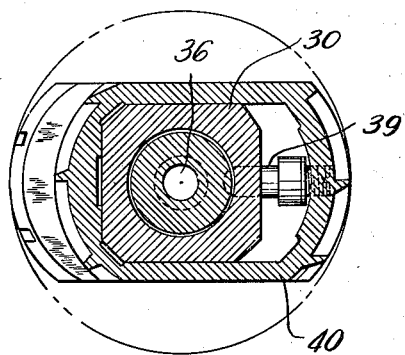

Patented Mar. 15, 1949

2,464,390

UNITED STATES PATENT OFFICE 2,464,390

OIL WELL CASING SCRAPER

Otto Hammer, Whittier, Calif.

Application June 2, 1945, Serial No. 597,330

6 Claims. (Cl. 166—18)

This invention relates to improvements in casing scrapers, such as are employed to clean out cement sheaths which remain inside of oil well casing after cementing operations have been completed.

Casing scrapers of this type are also employed to remove burrs formed on the inside of casing occasioned by gun-perforating. They serve to remove obstructions of various kinds, such as cement or burrs so that packers and other equipment can be run freely through the casing and set properly therein.

Scrapers now in general use consist of a mandrel with three equally spaced vertical blades which are movable through vertical slots provided therefor in the mandrel. Coil springs are located in the bottoms of the slots and serve to urge the blades outwardly into extended position and create a strong frictional contact between cutting edges of the blades and the interior of the casing. Objections to this type of construction are (1) that the tool does not impart a correct cutting action to the cement burrs or other obstructions that are to be removed; (2) the vertical line of contact between the blades and the interior of the casing does not provide sufficient circumferential contact to assure complete and clean removal of the obstructions; (3) a strong spring action is required to force the blade to cut and instances are known where the casing itself has been actually cut by this severe action.

An object of the present invention is to provide an improved casing scraper wherein the engagement between the scraper elements or cutters and the interior of the casing is circumferentially distributed and which is so designed as to present a cutting edge conducive to an easy slicing or shearing action on the cement or burrs that are to be removed.

Another object of the invention is to provide a casing scraper which is of relatively simple, and highly durable construction and which is so designed that parts may be reversed to present new or sharp cutting edges, thus prolonging the useful life of the tool.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation, parts being broken away and shown in section illustrating the casing scraper embodying the present invention;

Fig. 2 is a sectional view taken substantially upon the line 2—2 upon Fig. 1; and Fig. 3 is a sectional view taken substantially upon the line 3—3 upon Fig. 1; and Fig. 4 is a vertical section through an alternative form of construction; and Fig. 5 is a horizontal section taken substantially upon the line 5—5 upon Fig. 4.

Referring to the accompanying drawings wherein similar reference characters designate similar parts throughout, the improved casing scraper comprises a mandrel 10 which may be internally threaded as at 11 to provide a tool joint box. The other end of the mandrel may be threaded to provide a pin 12 receivable in a special tool joint sub 13. The special tool joint sub 13 provides one shoulder at one end of the squared length of the mandrel 14 there being an opposed shoulder formed on the mandrel at 15. Between these shoulders the mandrel is generally rectangular in cross section, as shown in Figs. 2 and 3, although the corners may be beveled off as illustrated. A series of scraper elements 16 encircle the mandrel and are disposed between the two shoulders. These scraper elements are generally rectangular in cross section and each has a pair of opposed sides 17 and 18 designed to slidably fit the sides of the squared portion of the mandrel to permit of lateral sliding movement of the scraper elements. The ends of the scraper elements are of generally cylindrical shape, the radius of curvature more or less approaching the radius of curvature of the interior of the casing that is to be scraped thereby. A series of inclined or helical teeth 19 are formed on the exteriors of the ends of the scraper elements and in the preferred form of construction these teeth are interrupted as indicated at 19a. Pockets 20 are formed on the interiors of the ends and serve as spring seats for coil compression springs 21 which serve to urge the scraper elements laterally or outwardly with respect to the mandrel. Hardened washers 22 are interposed between adjacent scraper elements and suitable end plates 23 may be positioned between the endmost scraper elements and the opposed shoulders. The scraper elements are arranged on the mandrel so as to be urged outwardly in different directions. Thus, the lowermost scraper element may be arranged to slide on two opposed faces of the mandrel in one direction laterally. The scraper element next above is preferably arranged to slide on the mandrel in a diametrically opposite direction or in a direction spaced 180° from the lowest scraper element. In a similar manner, the upper two scraper elements are arranged on the mandrel to slide in opposite directions from each other or in directions spaced 90° and 270° from the direction of the lowermost scraper element.

In using the tool the scraper elements may be compressed or caused to assume collapsed positions around the mandrel on compressing the springs 21, thus permitting the scraper to be introduced through a casing that may be internally lined with cement that is to be removed.

When the tool is turned in the casing by a run-in string of pipe the scraper elements are held against rotation relatively to the mandrel by opposed sides of the scraper elements fitting and bearing against opposed sides of the mandrel. The helically arranged teeth 18 tend to slice or shear the cement from the interior of the casing and in the event there are burrs on the interior of the casing the interrupted teeth will tend to shear them off on engagement with the ends of the teeth at the interruptions.

A central circulation passage 24 extends through the mandrel for conducting circulation fluid therethrough, and the space 25 between the sides of the scraper elements and the interior of the casing provides an adequate passage for the circulation fluid to return. In the event that the teeth on the outermost ends of the scraper elements become dulled or worn the scraper may be disassembled by removing the special tool joint 13 and reversing the scraper elements with relation to the mandrel thus bringing a new or sharp set of teeth into a position wherein they will be projected outwardly into engagement with the casing.

In Figs. 4 and 5 an alternative form of construction is disclosed therein. The mandrel 30 is of substantially square cross section as previously described having one end internally threaded as at 31 providing a tool joint box and the other end threaded as at 32 to be receivable in a sub 33. The interior of the mandrel is enlarged to provide a type of cylinder 34 in which the hollow piston 35 is reciprocable. This piston has a longitudinally extending bore 36 extending therethrough and may be equipped with an upwardly facing cup leather 37. Below the cup leather the piston is formed with a series of conical cam surfaces 38 engageable by pins or cam followers 39 that extend through the sides of the mandrel 30. These pins or cam followers are detachably mounted on the scraper elements 40 which may have the inclined or helically shaped interrupted teeth previously described. The scraper elements are of rectangular cross section generally as illustrated in Fig. 5 although the outer faces of the short sides are preferably mounted to more or less conform to the interior of the casing that is to be scraped. Threaded holes are provided in each of the short or narrow faces of the scraper elements so that the pins or cam followers 39 may be applied to either of them thus making the scraper elements reversable when one set of teeth may have become worn.

A compression spring 41 is adjustably mounted as at 42 in the bottom of the mandrel and is engageable with the bottom of the hollow piston so as to urge it upwardly. If desired, the bottom of the piston may be equipped with a downwardly facing cup leather 43. Hardened washers 44 may be interposed between adjacent scraper elements and opposed end plates 45 may be positioned against the ends of the uppermost and lowermost scraper elements respectively.

The operation of this form of construction is substantially as follows: When the tool has been introduced into the casing that is to be scraped the circulation of fluid in the drilling string is pumped down through the device. Much of this fluid may pass downwardly through the central bore 36 to maintain circulation in the well. However, a pressure is effective on the top of the piston to force it downwardly within the mandrel against the action of spring 41. This causes the conical or cam surfaces to engage the pins or cam followers 39 and to shift the scraper elements outwardly relatively to the mandrel. While the construction illustrated in Fig. 4 is shown as having only two scraper elements 180° apart it is manifest that the number of scraper elements may be increased to four which are arranged to be urged outwardly in directions 90° apart from each other. When the scraper elements are urged outwardly they are effectively held against turning on the mandrel by the engagement of the long sides of the scraper elements with opposed sides of the scraper mandrel. Whenever the pressure of the circulation fluid that is pumped down through the tool is relieved spring 41 becomes effective to lift the horizontal pistons and thus permit the scraper elements to collapse or assume retracted positions relative to the mandrel thus facilitating withdrawal.

It will be noted from the above-described construction that the arrangement is such that each scraper element presents a relatively wide area on its ends so that its engagement with the interior of the casing will be circumferentially distributed into a considerable extent. Consequently, even though the springs 21 urge the scraper elements outwardly with considerable force likelihood of cutting through the casing is largely, if not entirely, eliminated.

Various changes may be made in the details of construction without departing from the spirit and scope of the invention as defined by the appended claims.

I claim:

1. A casing scraper comprising a mandrel substantially square in cross-section, and a series of scraper elements surrounding the mandrel having opposed sides fitting against opposed sides of the mandrel and slidable thereon to permit the scraper elements to move laterally relatively thereto, and means for urging the scraper elements laterally with respect to the mandrel.

2. A casing scraper comprising a mandrel substantially square in cross-section and a series of oblong scraper elements thereon, each of which is arranged to slide outwardly on the mandrel in a different direction, and spring means urging said scraper elements outwardly in their respective directions.

3. A casing scraper comprising a series of scraper elements having oblong openings therethrough, a hollow mandrel extending through said openings having parallel opposite sides against which sides of the scraper elements are slidable, said scraper elements being laterally slidable with respect to the mandrel in different directions, means urging the scraper elements outwardly with respect to the mandrel there being scraper teeth on the ends of the scraper elements.

4. A casing scraper comprising a series of scraper elements having oblong openings therethrough, a hollow mandrel extending through said openings having parallel opposite sides against which sides of the scraper elements are slidable, said scraper elements being laterally slidable with respect to the mandrel in different directions, means urging the scraper elements outwardly with respect to the mandrel there being scraper teeth on each end of each scraper elements whereby, on reversing the position of any scraper element with respect to the mandrel, a new or sharp set of scraper teeth may be presented on the outermost end thereof.

5. A casing scraper comprising a mandrel having an opposed pair of parallel sides, scraper elements having opposed sides slidably engaging said sides and presenting at their ends scraping teeth and hydraulic means for urging the scraper elements laterally with respect to the mandrel and to slide on the mentioned sides of the mandrel.

6. A casing scraper comprising a mandrel substantially square in cross-section, a plurality of scraper elements of substantially rectangular cross-section surrounding the mandrel and slidable laterally with respect thereto, a hollow piston reciprocable in the mandrel adapted to be forced downwardly relatively thereto by the pressure of circulation fluid, and means operable by the piston for moving the scraper elements laterally relatively to the mandrel.

OTTO HAMMER.

REFERENCES CITED

The following references are of record in the file of this patent:

UNITED STATES PATENTS

| Number | Name | Date |
| --- | --- | --- |
| 1,058,521 | Ashton | Apr. 8, 1913 |
| 1,162,393 | Petrich | Nov. 30, 1915 |
| 1,777,559 | Grant | Oct. 7, 1930 |
| 2,053,829 | Hise | Sept. 8, 1936 |
| 2,275,939 | Baker | Mar. 10, 1942 |